United States Patent
Myers et al.

(10) Patent No.: US 6,535,160 B1
(45) Date of Patent: Mar. 18, 2003

(54) "ON AIRCRAFT" ELEVATION BORESIGHT CORRECTION PROCEDURE FOR THE E-3 ANTENNA

(75) Inventors: Benjamin R. Myers, Columbia, MD (US); David P. Parrish, Westminster, MD (US); Kurt G. Ramsey, Catonsville, MD (US); Richard S. White, Severna Park, MD (US); Gary I. Kosanovic, Sykesville, MD (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/960,507

(22) Filed: Sep. 24, 2001

(51) Int. Cl.$^7$ .............................. G01S 13/66; G01S 7/40
(52) U.S. Cl. ........................ 342/81; 342/74; 342/165; 342/173; 342/174; 342/175; 342/195; 342/368; 342/377

(58) Field of Search ............................. 342/73–81, 157, 342/158, 165–175, 195, 368, 369–377, 147, 149, 150–154, 89–103

(56) References Cited

U.S. PATENT DOCUMENTS

| 4,160,975 A | * | 7/1979 | Steudel ........................ 342/149 |
| 5,808,578 A | * | 9/1998 | Barbella et al. ............. 342/149 |
| 5,905,463 A | * | 5/1999 | Hannan ........................ 342/373 |
| 5,977,906 A | * | 11/1999 | Ameen et al. ............... 342/165 |

\* cited by examiner

Primary Examiner—Bernarr E. Gregory
(74) Attorney, Agent, or Firm—William G. Auton

(57) ABSTRACT

On an element-by-element basis, measure phases between signals at Port A to Port B of the antenna feed network to get a phase measurement angle that corresponds to an angular difference between outgoing radar signals and target echo return signals; apply a least squares fit equation to the angular distance to get a correction phase slope across the array, $\delta^o$, and applying a phase slope correction of $\delta$ to the phases of the transmitted signal.

1 Claim, 3 Drawing Sheets

ANTENNA FEED NETWORK MEASUREMENT SETUP

"ON AIRCRAFT" ELEVATION BORESIGHT CORRECTION PROCEDURE FOR THE E-3 ANTENNA

STATEMENT OF GOVERNMENT INTEREST

The invention described herein may be manufactured and used by or for the Government for governmental purposes without the payment of any royalty thereon.

BACKGROUND OF THE INVENTION

Technical Field of the Invention

The present invention relates generally to an innovative approach to computer-based radar systems, and more particularly to a multi-mode boresight correction process Especially designed for the Air Force's Airborne Warning and Control System (AWACS).

The boresight correction procedure of the present invention is required for the Air Force's Airborne Warning and Control System (AWACS). This system uses radar equipment carried on E-3 Sentry aircraft.

The operators of AWACS systems, referred to as "weapons directors", perform tasks that are similar to those of a flight controller but that are far more complicated. Specifically, a weapons director has the additional responsibility of enhancing the combat capability to the fighter he controls. Not only does he transmit data about aircraft location, direction, and speed, he also communicates command directives, mission modifications, weather updates, airfield closures, refueling information, and coordination between other fighting elements both airborne and on the ground. He must know what information that pilot needs and be able to provide it at the appropriate time. The weapons director must learn to read a two-dimensional radar display, listen to communications from pilots, and from that, recognize what is occurring. In short, a weapons director must attain the knowledge and develop the decision-making abilities required to direct fighters in combat.

To date, AWACS weapons directors have been required to learn these skills in live training or during actual combat missions, but they have found that in a typical scenario, a target is first acquired by a targeting aid such as a ground-based radar or an AWACS aircraft. After the target is identified as potentially hostile, this information and the approximate location and velocity of the target are communicated to the launch aircraft. The targeting information is downloaded into the missile guidance computer, and the missile is launched. The missile then flies in a pattern either directly toward the target or on in a circuitous path so that the target continues to exhibit relative motion. The position and velocity of the target may be periodically updated with messages from the targeting aid to the missile guidance computer in some designs, and there may be no communication with the missile after launch in some other designs. For a successful mission, the sensor of the missile acquires the target during the terminal flight phase and guides the missile to the target. In the terminal phase of the flight, the AWACS targeting radar must be able to identify the target, but elevation boresight (beam pointing) errors have been found on several E-3 antennas after these antennas have been installed in their respective aircraft. In order to correct these errors in the past, it has been necessary to either remove the antenna from its aircraft installation; a very time-consuming process; or retune the antenna aperture phases, on aircraft, aircraft, by using an aperture coupled probe technique, which while very useful at one frequency, is not a practical solution for the reboresighting of an antenna at multiple frequencies because of the complexity of the test and the large amount of time involved in performing the test.

A need exists for the reboresighting of an E-3 antenna at all operating frequencies (typically eight or ten frequencies), in approximately one day or less. This represents a Please change line 10 of page 3 to read:

U.S. Pat. No. 6,053,736 issued to Huffman et al;

U.S. Pat. No. 5,458,041 issued to John Sun;

U.S. Pat. No. 4,825,223 issued to Brian Moore: and

U.S. Pat. No. 3,947,776 issued to Daniel Stevens.

The above-cited systems are useable with AWACS and Joint Stars systems, and are improved by the present invention, as discussed herein.

SUMMARY OF THE INVENTION

The present invention is a boresight correction procedure for use on a phased array of radiating elements that steer signals electronically by phased adjustment. The process begins as on an element by element basis, one measures phases between signals at Port A to Port B of the antenna feed network to get a phase measurement angle that corresponds to an angular difference between outgoing radar signals and target echo return signals. Next, the signal processor applies a least squares fit equation to the angular distance to get a correction phase slope across the array $\delta^0$, and applies a phase slope correction of 67 to the phases of the transmitted signal.

It is an object of the invention to provide an automatic boresight correction procedure for radar systems. This and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

The present invention is a boresight correction procedure for use with phased array antenna systems such as that used in the E-3 AWACS antenna.

Figure 1:
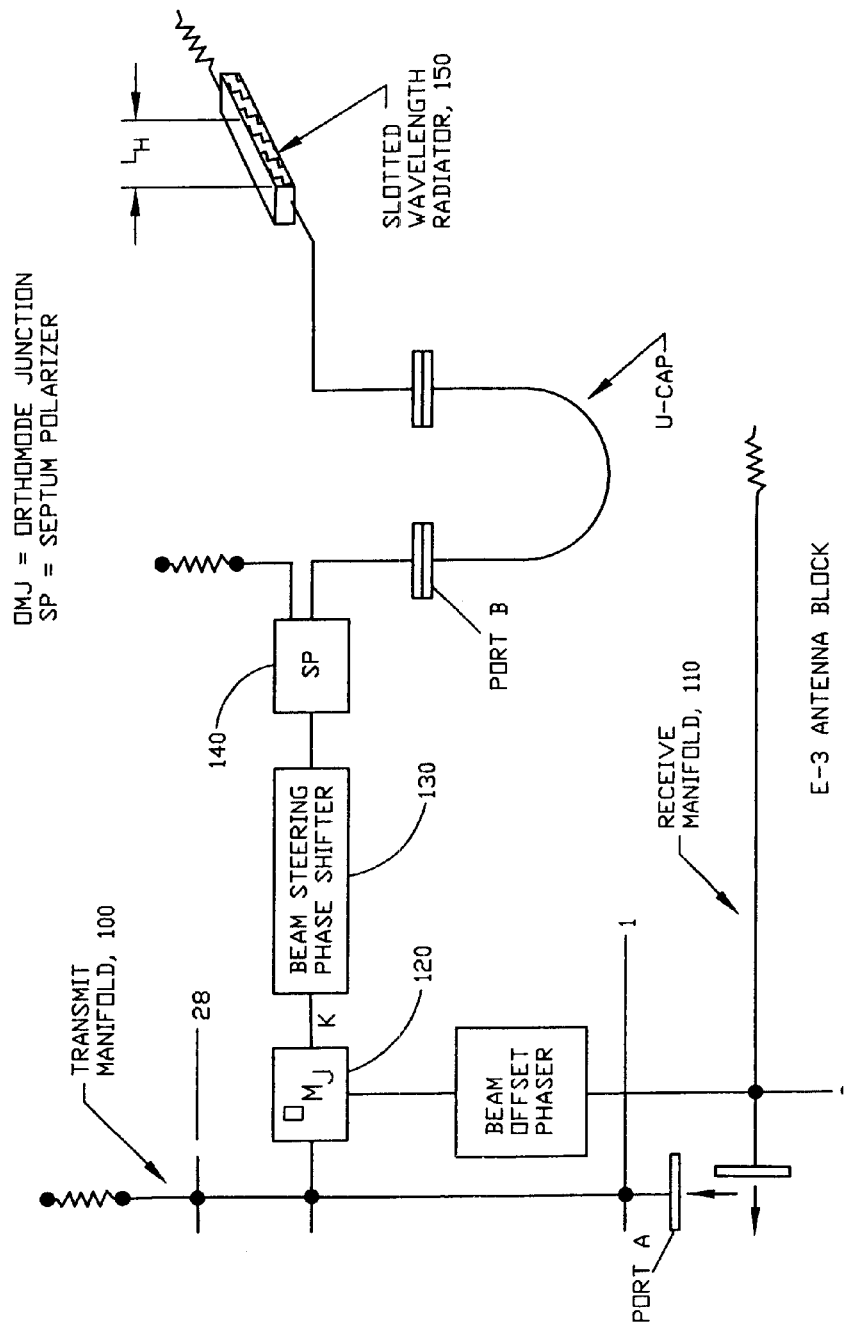
FIG. 1 is an E-3 antenna block diagram.

The reader's attention is now directed towards FIG. 1, which is a block diagram of the E-3 antenna system. The radar transmitter is connected to the antenna by the transmit manifold 100, while the receiver is connected to the receive manifold, 110. Port A is the duplexer that electrically separates the transmit manifold from the receive manifold.

Transmission signals for the transmitter are conducted by the orthomode junction, 120 to the beam steering phase shifter, 130, which electronically steers the direction of the beam by incremental shifts in phase of the signals emitted by each of the radiating elements in a planar array.

Port B and the U-cap conduct transmission signals to each radiator, 150, in the antenna array. Received signals are conducted back through the channel through Port A to the radar receiver.

Figure 2:
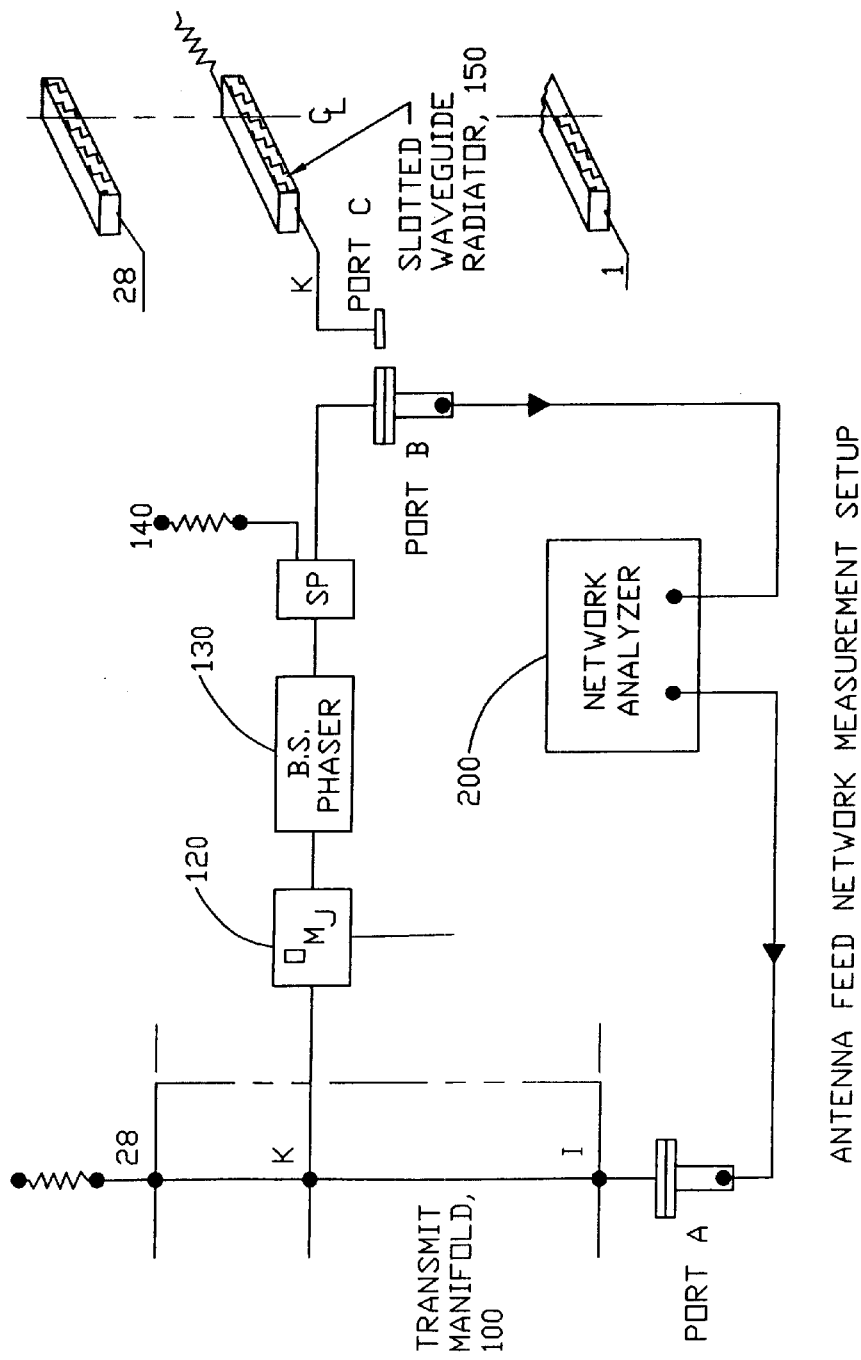
FIG. 2 is a block diagram of an antenna feed measuring setup for the present invention.

FIG. 2 is an illustration of the antenna feed network measuring setup. It has the same basic elements of FIG. 1, but adds a network analyzer, 200, between Port A and Port B.

The procedure of the present invention, referring to FIG. 2, measures phases from Port A to Port B of the antenna feed network. The phase information is then added to the theoretical phases for each stick, which consists of the theoretical phase from Port C to the center of each slotted waveguide radiating element. This is done for ten sticks (radiating elements) uniformly distributed across the array, in elevation. A least squares fir is applied to the above data to obtain a phase slope across the array, in elevation, and if the phase slope is greater than:

$$\Delta\phi = 2\pi s/\lambda \sin(\delta)$$

where $\delta$ is the allowable maximum boresight error magnitude, then an elevation boresight correction is required.

It should be noted that the actual phases from Port C of FIG. 2 are different than the corresponding theoretical phases and introduce errors into the actual phase function to which the least squares data fit is applied to ascertain the E-3 antenna elevation plane phase slope and hence its boresight error. However, since these phase errors are either random or even function systematic, they do not significantly affect the boresight error measurement. The systematic error is an even function since the variation in stick half lengths is an even function, as shown in FIG. 3.

Figure 3:
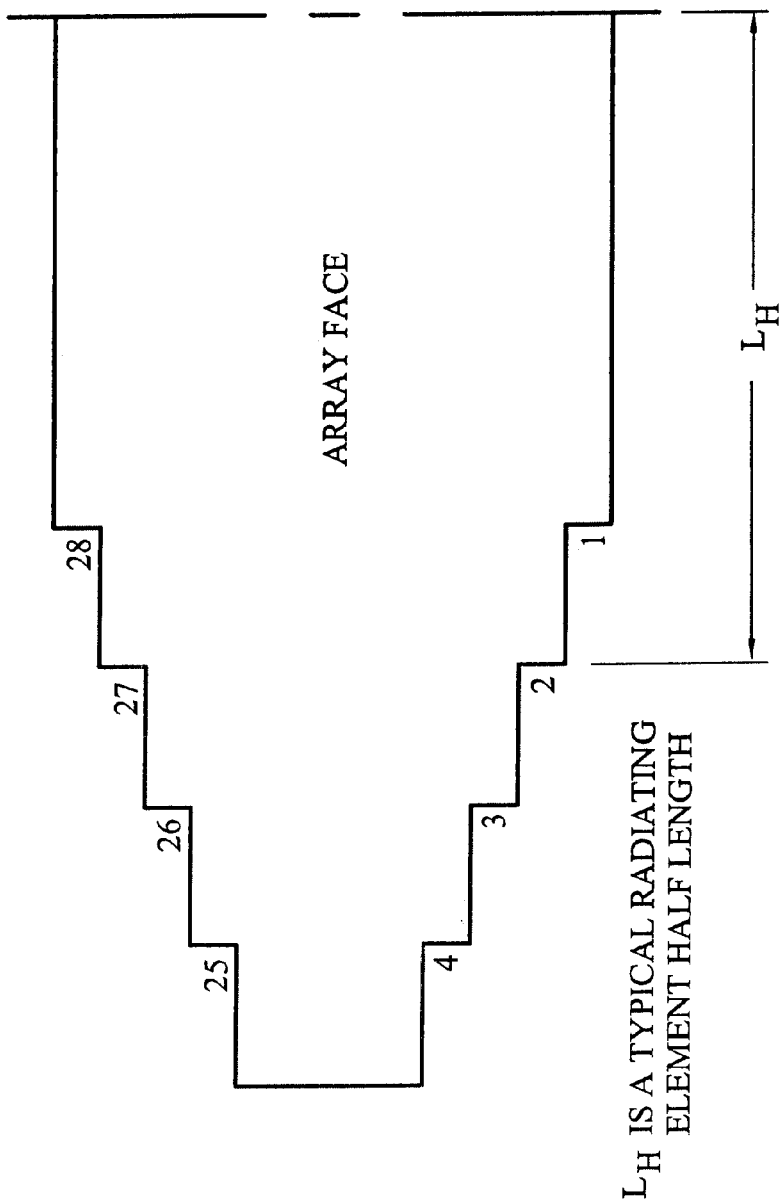
FIG. 3 is an illustration of radiating aperture stick half length profile demonstrating an even function when slotted wave guide radiators are used.

FIG. 3 is a chart of radating aperture stick half length profile demonstrating an even function. If the phase measurements, after analysis, show an out of spec elevation beam pointing or boresight error, then the antenna transmit tune prompts must be modified in accordance with the following algorithm:

s=the elevation stick spacing
$\theta$=the measured elevation beam angle
$\lambda$=the free space wavelength
$\phi_k = (k-14.5)\Delta\phi$
where:
$\Delta\phi = -360 s/\lambda \sin(\theta)$ Having done the above, the antenna is now reboresighted. Following the above procedure at each operating frequency completes the antenna elevation beam repositioning task.

The above-cited procedure represents a significant improvement in the state of the art with regard to correcting boresighting errors on the E-3 antenna while it is mounted on its platform aircraft. Previously employed procedures were much too costly or time consuming compared to the disclosed procedure.

While the invention has been described in its presently preferred embodiment, it is understood that the words which have been used are words of description rather than words of limitation, and that changes within the purview of the appended claims may be made without departing from the scope and spirit of the invention in its broader aspects.

What is claimed is:

1. A boresight correction procedure for use with a phased array radar which electronically steers transmitted signals for an array of elements by adjusting phases of transmitted signals on an element-by-element basis, and which detects angles of azimuth and elevation by phase differences in an element-by-element basis of received target return signals, said process comprising the steps of:

a measuring step which measures on an element-by-element basis, an angular difference represented by a phase of a transmitted signal for each element and a phase of a target echo return signal for each element;

a first applying step which applies a least squares fit equation to the angular difference determined in the measuring step to get a correction phase $\delta$ to be applied across the array; and a second applying step in which the correction phase $\delta$ is applied on an element-by-element basis to transmitted signals so that these transmitted signals have a central boresight axis steered towards a target that reflects back the target return signals.

* * * * *